United States Patent
Yun

(10) Patent No.: US 8,232,762 B2
(45) Date of Patent: Jul. 31, 2012

(54) COMPUTER AND BATTERY CHARGING METHOD THEREOF

(75) Inventor: Chong Kyu Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 12/036,419

(22) Filed: Feb. 25, 2008

(65) Prior Publication Data

US 2008/0218129 A1    Sep. 11, 2008

(30) Foreign Application Priority Data

Mar. 5, 2007    (KR) .................. 10-2007-0021620

(51) Int. Cl.
*H02J 7/00*    (2006.01)
*H02J 7/04*    (2006.01)

(52) U.S. Cl. .................. 320/103; 320/128; 320/148

(58) Field of Classification Search .................. 320/103, 320/113, 115, 148
See application file for complete search history.

(56) References Cited

U.S. PATENT DOCUMENTS

| | | | | |
|---|---|---|---|---|
| 5,565,757 A | * | 10/1996 | Ikeda et al. .................. | 320/137 |
| 5,835,366 A | * | 11/1998 | Pleso et al. .................. | 363/59 |
| 6,181,100 B1 | * | 1/2001 | Shoji .................. | 320/103 |
| 6,225,708 B1 | * | 5/2001 | Furukawa et al. .................. | 307/66 |
| 6,484,833 B1 | * | 11/2002 | Chhaya et al. .................. | 180/65.225 |
| 6,825,638 B2 | * | 11/2004 | Kim .................. | 320/119 |
| 2005/0040787 A1 | * | 2/2005 | Choi .................. | 320/103 |
| 2006/0119742 A1 | * | 6/2006 | Park .................. | 348/730 |

FOREIGN PATENT DOCUMENTS

| | | |
|---|---|---|
| CN | 1267116 A | 9/2000 |
| JP | 10-32539 | 2/1998 |
| KR | 2002-15493 | 2/2002 |
| KR | 2003-46238 | 6/2003 |

OTHER PUBLICATIONS

Chinese Office Action issued May 16, 2011 in CN Application No. 200810083205.5.
Chinese Office Action issued on Jan. 6, 2012 in CN Patent Application No. 200810083205.5.

* cited by examiner

*Primary Examiner* — M'baye Diao
(74) *Attorney, Agent, or Firm* — Stanzione & Kim, LLP

(57) ABSTRACT

A computer includes a system part which has at least one electronic component, a power supplying part which supplies a main electric power to the system part, a battery part which receives charging electric power from the power supplying part and supplies auxiliary electric power to the system part, and a controlling part which, if the main electric power is supplied by the power supplying part, and if charge level of the battery part according to supply of the charging electric power exceeds a reference level corresponding to a discharged state, cuts off the supply of the charging electric power and controls the battery part to discharge the auxiliary electric power.

12 Claims, 3 Drawing Sheets

COMPUTER AND BATTERY CHARGING METHOD THEREOF

CROSS-REFERENCE TO RELATED APPLICATIONS

This application claims priority from Korean Patent Application No. 10-2007-0021620, filed on Mar. 5, 2007 in the Korean Intellectual Property Office, the disclosure of which is incorporated herein by reference.

BACKGROUND OF THE INVENTION

1. Field of the Invention

Apparatuses and methods consistent with the present general inventive concept relate to a computer and a battery charging method thereof, and more particularly, to a computer which can determine whether to cut off supply of power to a battery, and a battery charging method thereof.

2. Description of the Related Art

A portable computer, such as a notebook computer and a personal digital assistant (PDA), having a battery attached thereto is widely utilized as it can be carried and used while in motion. Generally, the computer uses an external power source as its main power supply through an AC/DC adapter or other known power devices in the art, and a battery as its auxiliary power supply. The battery can be recharged by the adapter. A Lithium-Ion battery is often used as the battery because it has high stability and a long lifetime.

A conventional computer, receiving external electric power, supplies the external electric power both to the battery, which is attached to the computer, to charge the battery and to a system part.

In this case, although the battery is attached to the computer, only power from the applied external electric power is supplied to the system part. The electric power of the battery is not supplied to the system part in order to keep the battery in a fully charged state. However, maintaining the battery in the fully charged state decreases the maximum chargeable capacity of the battery and decreases the lifetime of the battery.

SUMMARY OF THE INVENTION

The present general inventive concept provides a portable device and a battery charging method thereof which cuts off a supply of a charging electric power to a battery, if a main electric power is supplied by an outer electric power source, to maintain the battery in a discharging state, thus increasing the chargeable capacity of the battery.

The present general inventive concept also provides a portable device and a battery charging method thereof which can make it possible for a user to determine whether to cut off a supply of a charging electric power to the battery thus providing convenience to the user in using the battery. The portable device may be a computer or PDA.

Additional aspects of the present general inventive concept will be set forth in part in the description which follows and, in part, will be obvious from the description, or may be learned by practice of the present general inventive concept.

The foregoing and/or other aspects and utilities of the present general inventive concept may be achieved by providing a computer including a system part which has at least one electronic component, a power supplying part which supplies a main electric power to the system part, a battery part which receives charging electric power from the power supplying part and supplies auxiliary electric power to the system part, and a controlling part which, if the main electric power is supplied by the power supplying part, and if charge level of the battery part according to supply of the charging electric power exceeds a reference level corresponding to a discharged state, cuts off the supply of the charging electric power and controls the battery part to discharge the auxiliary electric power.

If the charge level of the battery part exceeds the reference level, the controlling part may cut off supply of the electric power from the power supplying part to the system part and controls the battery part to supply the auxiliary electric power to the system part.

If the charge level of the battery part is lower than the reference level, the controlling part may cut off supply of the electric power from the battery part to the system part, and controls the power supplying part to supply the main electric power to the system part.

If the charge level of the battery part is lower than the reference level, the controlling part may cut off supply of the electric power from the battery part to the system part, and controls the power supplying part to supply the main electric power to the system part.

The reference level may be 3% to 5% of the maximum charge level of the battery part.

The computer further may include a switching part which switches supply of electric power from the power supplying part to the battery part, wherein, if the charge level of the battery part exceeds the reference level, the controlling part controls the switching part to cut off the supply of the charging electric power.

The controlling part may receive charge level information of the battery part by turning on and off the switching part periodically.

The computer may further include a user interface to receive a user's input about whether to cut off supply of the electric power, wherein, if the user's input to cut off supply of the electric power is received from the user interface, the controlling part controls the power supplying part to cut off the supply of the electric power supply.

The foregoing and/or other aspects and utilities of the present general inventive concept may also be achieved by providing a battery charging method of a computer including a system part which has at least one electronic component, a power supplying part which supplies a main electric power to the system part, and a battery part which receives charging electric power from the power supplying part and supplies auxiliary electric power to the system part, the battery charging method including sensing supply of the main electric power, determining, if the supply of the main electric power is sensed, whether charge level of the battery part according to the supply of the charging electric power exceeds a reference level corresponding to a discharged state, and cutting off the supply of the charging electric power, if the charge level exceeds the reference level, and discharging the auxiliary electric power.

The cutting off and discharging may include cutting off supply of electric power from the power supplying part to the system part; and supplying the auxiliary electric power from the battery part to the system part.

If the charge level of the battery part is lower than the reference level, the cutting off and discharging may include cutting off supply of the electric power from the battery part to the system part; and supplying the main electric power to the system part.

If the charge level of the battery part is lower than the reference level, the cutting off and discharging may include cutting off supply of the electric power from the battery part to the system part; and supplying the main electric power to the system part.

The reference level may be 3% to 5% of the maximum charge level of the battery part.

The computer may further include a switching part which switches supply of electric power from the power supplying part to the battery part, and the cutting off and discharging includes cutting off the supply of the charging electric power by the switching part.

The determining of the charge level may further include receiving charge level information of the battery part by periodically turning on and off the switching part.

The battery charging method of a computer may further include receiving a user's input about whether to cut off the charging electric power, wherein the cutting off and discharging includes cutting off the supply of the charging electric power if the user's input corresponding to the cutting off the charging electric power is received.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
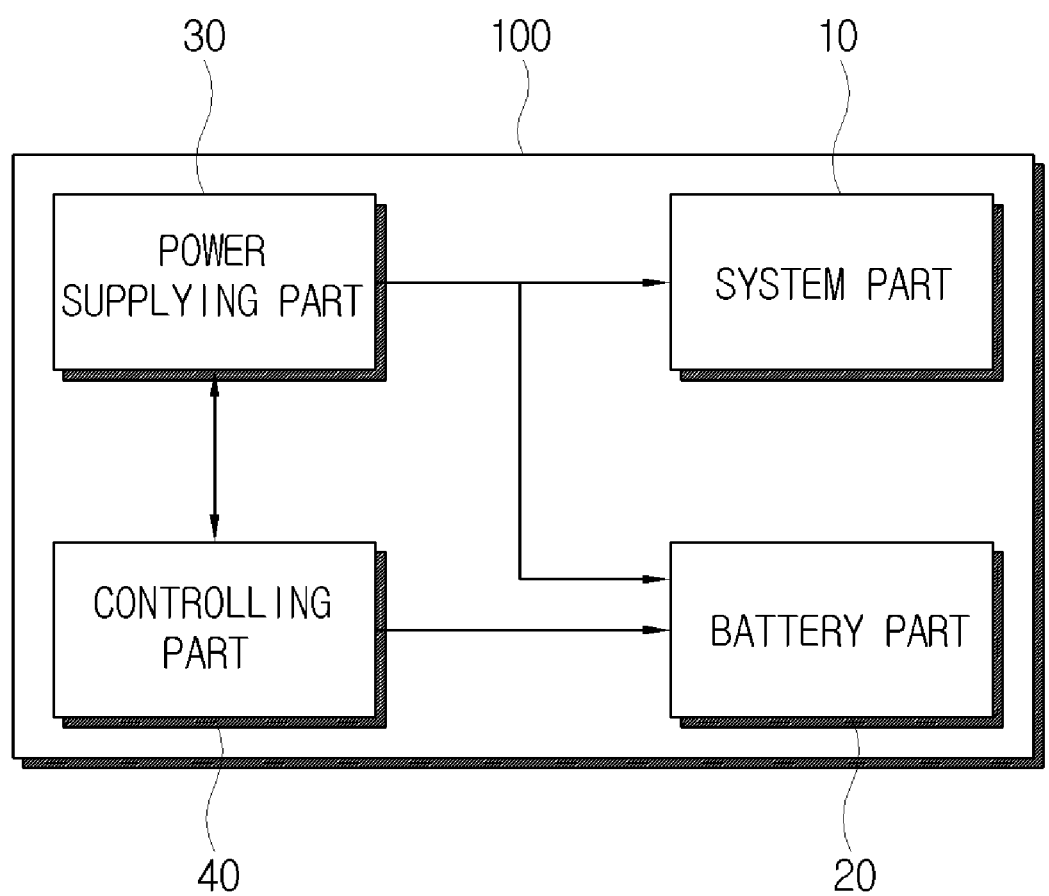
FIG. 1 is a block diagram describing configuration of a computer according to an exemplary embodiment.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram describing configuration of a computer 100 according to an exemplary embodiment. As illustrated in FIG. 1, the computer 100 according to this exemplary embodiment includes a system part 10, a battery part 20, a power supplying part 30 and a controlling part 40. The computer 100 may be embodied by a portable computer or other known computing devices in the art.

The system part 10 has at least one electronic component which may perform a main function of the computer 100 when supplied with electric power. For example, if the computer 100 according to this exemplary embodiment is a portable computer, the electronic component of the system part 10 may include a central processing unit (CPU), a random access memory (RAM), a chip set, a main board, a graphic card or other known components in the art.

The battery part 20 supplies auxiliary electric power to the system part 10. The battery part 20 according to this exemplary embodiment is a battery which can be charged by the power supplying part 30, and includes at least one battery cell which has its specifications according to its charge and output voltages. The battery part 20 may be embodied by a smart battery which can transmit/receive data to/from the controlling part 40 to be described later.

The power supplying part 30 supplies electric power to the system part 10 and charging electric power to the battery part 20. For ease of description, the power supplied by the power supplying part 30 is referred to as the main electric power, however, it need not be the main power and may alternatively be an auxiliary power. The power supplying part 30 according to this exemplary embodiment may be embodied by an adapter which receives an external alternating current (AC) electric power and outputs direct current (DC) electric power.

If the main electric power is supplied by the power supplying part 30 (e.g., the adaptor), and if the charge level of the battery part 20 exceeds a reference level corresponding to a discharged state, the controlling part 40 cuts off supply of the charging electric power to the battery part 20, cuts of supply of the main electric power to the system part 10 and discharges the auxiliary electric power provided by the battery part 20. The controlling part 40 according to this exemplary embodiment may be embodied by a microcomputer and may include an electric power sensing part to sense supply of a main electric power.

Hereinafter, operation of the computer 100 according to an exemplary embodiment is described in detail with reference to FIG. 2.

Figure 2:
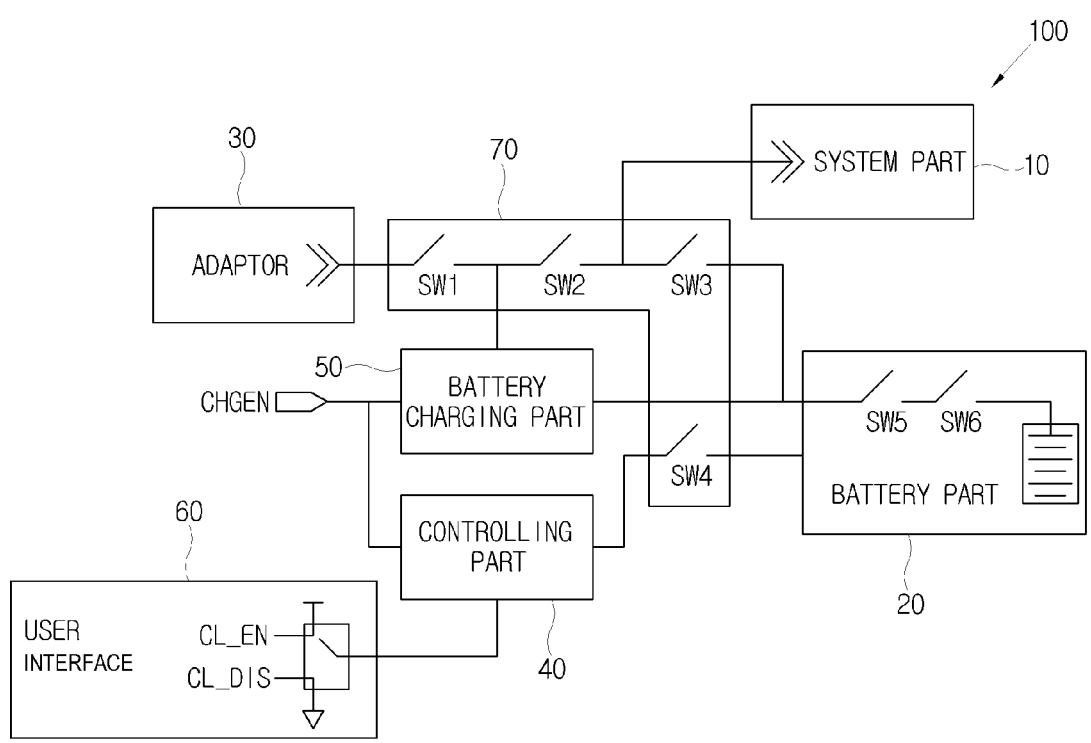
FIG. 2 is a circuit diagram describing the configuration of the computer according to the exemplary embodiment.

FIG. 2 is a detailed circuit diagram which illustrates a configuration of the computer 100 according to an exemplary embodiment. As illustrated in FIG. 2, the computer 100 according to this exemplary embodiment may further include a battery charging part 50 and a user interface 60.

The battery charging part 50 charges the battery part 20 with the charging electric power from the power supplying part (adaptor) 30. The battery charging part 50 according to this exemplary embodiment may include a voltage converting part which converts the electric power of a voltage level outputted by the power supplying part (adaptor) 30 to an electric power with a voltage level used for charging.

The user interface 60 receives a user's input instructing whether to cut off supply of the charging electric power from the power supplying part 30 to the battery part 20. The user interface 60 according to this exemplary embodiment may be embodied by a switch or button provided at a side of the computer 100 and may also be embodied by a predetermined menu key provided in the computer 100.

For example, the user interface 60 may be embodied by the main user interface of the computer 100 and may include a keyboard, pointer device (such as a mouse or touch pad) and a display to receive a user's input instructing whether to cut off supply of the charging electric power to the battery part 20.

The controlling part 40 receives a sensing signal CHGEN corresponding to the supply of the main electric power from the power supplying part 30. Signal CHGEN may be the same as that output by the power supplying part 30, or some other signal derived from the output of the power supplying part 30 (e.g., a signal having standard CMOS logic values output from a sensor sensing the output of the power supplying part 30). Alternatively, signal CHGEN may be the same as or derived from the input to the power supplying part 30. Then, if the controlling part 40 determines by the sensing signal CHGEN that the electric power is supplied, it determines whether the charge level of the battery part 20 exceeds the reference level corresponding to a substantially discharged state. In this case, the reference level corresponding to the substantially discharged state may be 3% to 5% of the maximum charge level of the battery part 20. If the charge level of the battery part 20 is lower than the reference level, the controlling part 40 determines the state of the battery part 20 to be in a discharged state. Alternatively, the controlling part 40 may determine that the battery part 20 is in a discharged state when no charge can be sensed being output from battery part 20 (with switches SW4, SW5 and SW6 closed).

Of course, the controlling part 40 determines the charge level of the battery part 20 when the battery part 20 is attached to the computer 100. Also, through the user interface 60, the controlling part 40 receives a signal CL_EN to enable the supply of the charging electric power to the battery part 20 to be cut off, and the controlling part 40 receives the corresponding signal CL_DIS indicating a command to supply the charging electric power to the battery part 20 irrespective of a low charge level of the battery part 20.

If there is a CL_DIS input from the user interface 60 to supply the charging electric power to the battery part 20, the controlling part 40 may determine whether the charge level of the battery part 20 is lower than the maximum charge level. Then, if the charge level of the battery part 20 is determined to be lower than the maximum charge level, the controlling part 40 enables the main electric power to be supplied to the battery part 20.

If there is a CL_EN input from the user interface 60 and if the controlling part 40 determines that the charge level of the battery part 20 exceeds the reference level corresponding to the discharged state, the controlling part 40 cuts off the supply of the charging electric power from the power supplying part 30 to the battery part 20. Accordingly, the electric power level of the battery part 20 can be maintained to correspond to the discharged state, thus maximizing the lifetime of the battery part 20.

In this example, the computer 100 according to the exemplary embodiment may include a switching unit 70. Switching unit 70 may include switching parts SW1, SW2, and SW3 on an electric power supplying line provided from the power supplying part 30 to the system part 10 and the battery part 20, and a switching part SW4 on a line connecting the controlling part 40 and the battery part 20. Many other alternatives may be implemented to enable the desired connections and disconnections. For example, here battery part 20 also includes switching parts SW5 and SW6.

Accordingly, if the battery part 20 is not attached to the computer 100, the controlling part 40 turns on SW1 and SW2 and turns off SW3 and SW4, thus enabling the main electric power to be supplied from the power supplying part 30 to the system part 10, and cutting off connections from the supply of the auxiliary electric power from the battery part 20 to the system part 10 and to controlling part 40.

If the charge level of the battery part 20 exceeds the reference level, the controlling part 40 turns off SW1 and SW2 and turns on SW3, SW4, SW5, and SW6, thus cutting off the supply of the main electric power from the power supplying part 30, and causing the battery part 20 to supply the auxiliary electric power to the system part 10. Therefore, the time for the battery part 20 to be discharged to reach a charge level lower than the reference level is decreased.

Also, if the charge level of the battery part 20 becomes lower than the reference level, the controlling part 40 may turn on SW1 and SW2 and turn off SW3, SW4, SW5, and SW6, thus enabling the main electric power to be supplied from the electric power supplying part 30 to the system part 10, and cutting off the supply of the auxiliary electric power from the battery part 20 to the system part 10.

Although the controlling part 40 cuts off the supply of the charging electric power by switching off the switching part SW4 provided on the connecting line between the battery part 20 and the controlling part 40, the controlling part 40 may receive electric power level information of the battery part 20 by switching the switching part SW4 periodically.

Figure 3:
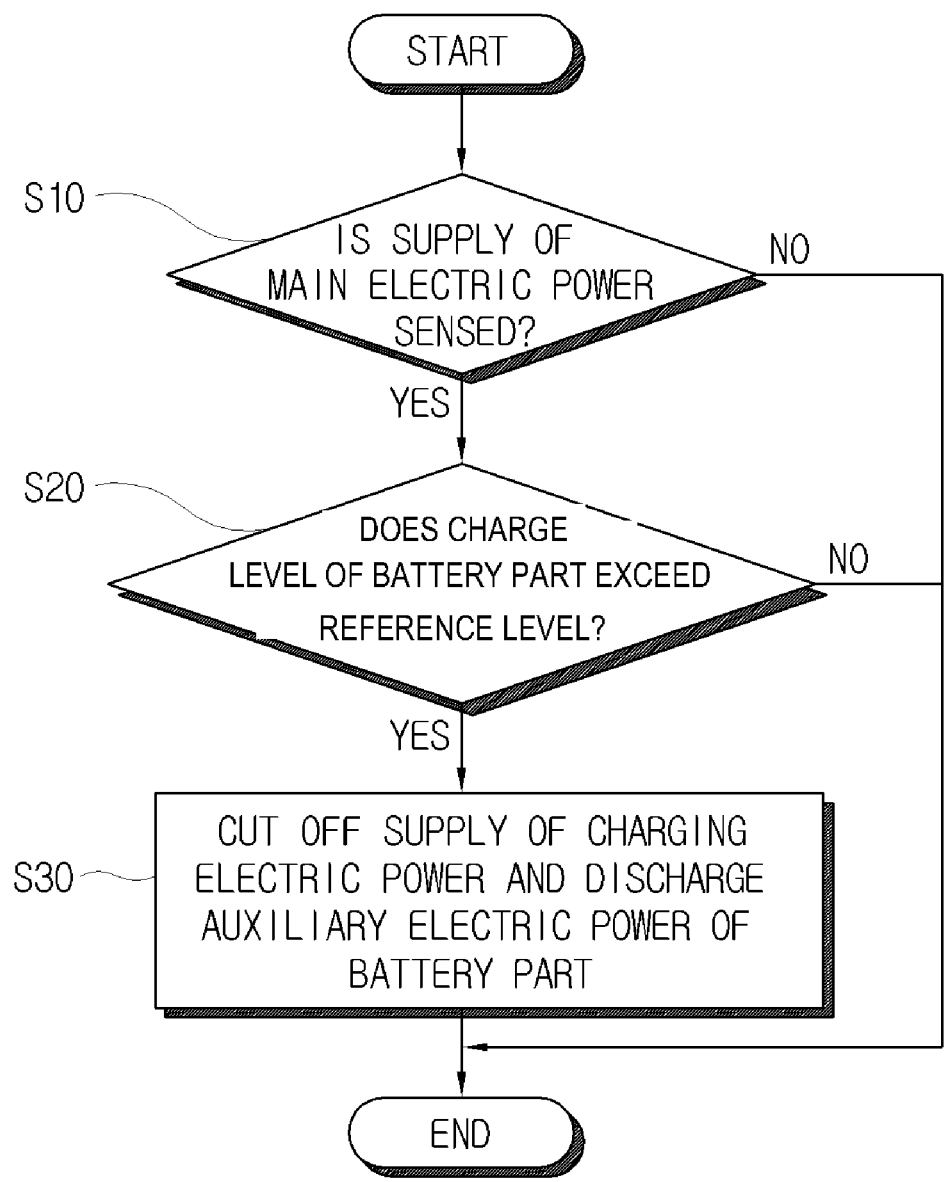
FIG. 3 is a flow diagram describing a battery charging method of a computer according to the exemplary embodiment.

Hereinafter, a battery charging method of the computer 100 according to an exemplary embodiment is described with reference to FIG. 3.

First, the controlling part 40 senses supply of the main electric power at operation S10. Then, if the supply of the main electric power has been sensed at operation S10, the controlling part 40 determines whether the charge level of the battery part 20 exceeds the reference level corresponding to the discharge state or not at operation S20. In this case, an operation where the controlling part 40 receives the user's input instructing whether to cut off the charging electric power can be performed in addition to operation S20. Of course, the operation where the controlling part 40 receives the user's input instructing whether to cut off the charging electric power may be performed before performing operation S20.

Then, if the charge level of the battery part 20 exceeds the reference level, the controlling part 40 cuts off the supply of the charging electric power and discharges the auxiliary electric power of the battery part 20 at operation S30. Here, the controlling part 40 may also enable supply of the electric power from the power supplying part 30 to the system part 10 to be cut off, and the auxiliary electric power to be supplied from the battery part 20 to the system part 10.

Also, if the charge level of the battery part 20 is lower than the reference level, the operation S30 may further include an operation where supply of the electric power from the battery part 20 to the system part 10 is cut off, and an operation where the main electric power is supplied to the system part 10.

As described above, with the computer and battery charging method thereof, if the main electric power is supplied by the external electric power source, supply of the charging electric power to a battery can be cut off to maintain the battery in the discharge state, thus maximizing chargeable capacity of the battery.

Also, with the computer and battery charging method thereof, it is possible for the user to determine whether to cut off supply of the charging electric power to the battery, thus providing convenience to the user in using the battery.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transition terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A computer comprising:

a system part including at least one electronic component;

a power supplying part which supplies electric power to the system part;

a battery part to receive a charging electric power supplied from the power supplying part and to supply auxiliary electric power to the system part; and a controlling part configured to:
cut off the supply of electric power to the battery part and control the battery part to discharge the auxiliary electric power to the system part, if a charge level of the battery part exceeds a reference level corresponding to a discharged state; and cut off the supply of the electric power from the battery part to the system part and control the power supplying part to supply the electric power to the system part, if the charge level of the battery part is lower that the reference level.

2. The computer according to claim 1, wherein, if the charge level of the battery part exceeds the reference level, the controlling part cuts off supply of the electric power from the power supplying part to the system part and controls the battery part to supply the auxiliary electric power to the system part.

3. The computer according to claim 1, wherein the reference level is 3% to 5% of the maximum charge level of the battery part, 4. The computer according to claim 1, further comprising a switching part which switches supply of electric power from the power supplying part to the battery part, wherein, if the charge level of the battery part exceeds the reference level, the controlling part controls the switching part to cut off the supply of the charging electric power.

5. A computer comprising:
a system part including at least one electronic component;
a power supplying part which supplies electric power to the system part;
a battery part to receive a charging electric power supplied from the power supplying part and to supply auxiliary electric power to the system part;
a switching part configured to switch the supply of electric power from the power supplying part to the battery part;
a controlling part configured to:
cut off the supply of electric power to the battery part and control the battery part to discharge the auxiliary electric power to the system part, if a charge level of the battery part exceeds a reference level corresponding to a discharged state; and
control the switching part to cut off the supply of the charging electric power, if the charge level of the battery part exceeds the reference level; and
receive charge level information of the battery part by turning on and off the switching part periodically.

6. A computer comprising:
a system part including at least one electronic component;
a power supplying part which supplies electric power to the system part;
a battery part to receive a charging electric power supplied from the power supplying part and to supply auxiliary electric power to the system part;
a user interface to receive a user's input about whether to cut off supply of the electric power; and
a controlling part configured to:
cut off the supply of electric power to the battery part and control the battery part to discharge the auxiliary electric power to the system part, if a charge level of the battery part exceeds a reference level corresponding to a discharged state; and
control the power supplying part to cut off the supply of the electric power supply, if the user's input to cut off supply of the electric power is received from the user interface.

7. A battery charging method of a computer comprising a system part which has at least one electronic component, a power supplying part which supplies electric power to the system part, and a battery part which receives charging electric power from the power supplying part and supplies auxiliary electric power to the system part, the battery charging method comprising:
determining whether a charge level of the battery part exceeds a reference level corresponding to a discharged state;
cutting off the supply of the charging electric power, if the charge level exceeds the reference level and discharging the auxiliary electric power; and
cutting off the supply of the electric power from the battery part to the system part and supplying the main electric power to the system part, if the charge level of the battery part is lower than the reference level.

8. The battery charging method of a computer according to claim 7, wherein the cutting off of the supply of the charging electric power and the discharging of the auxiliary power further comprises:
cutting off supply of electric power from the power supplying part to the system part; and
supplying the auxiliary electric power from the battery part to the system part.

9. The battery charging method of a computer according to claim 7, wherein the reference level is 3% to 5% of the maximum charge level of the battery part.

10. The battery charging method of a computer according to claim 7, further comprising receiving a user's input about whether to cut off the charging electric power, wherein the cutting off and discharging comprises cutting off the supply of the charging electric power if the user's input corresponding to the cutting off the charging electric power is received.

11. A battery charging method of a computer comprising a system part which has at least one electronic component, a power supplying part which supplies electric power to the system part, and a battery part which receives charging electric power from the power supplying part and supplies auxiliary electric power to the system part, the battery charging method comprising:
determining whether a charge level of the battery part exceeds a reference level corresponding to a discharged state;
cutting off the supply of the charging electric power and discharging the auxiliary electric power, if the charge level exceeds the reference level, by using a switching part of the computer that switches the supply of electric power from the power supplying part to the battery part.

12. The battery charging method of a computer according to claim 11, wherein determining the charge level further comprises receiving charge level information of the battery part by periodically turning on and off the switching part.

* * * * *